Patented Feb. 19, 1935

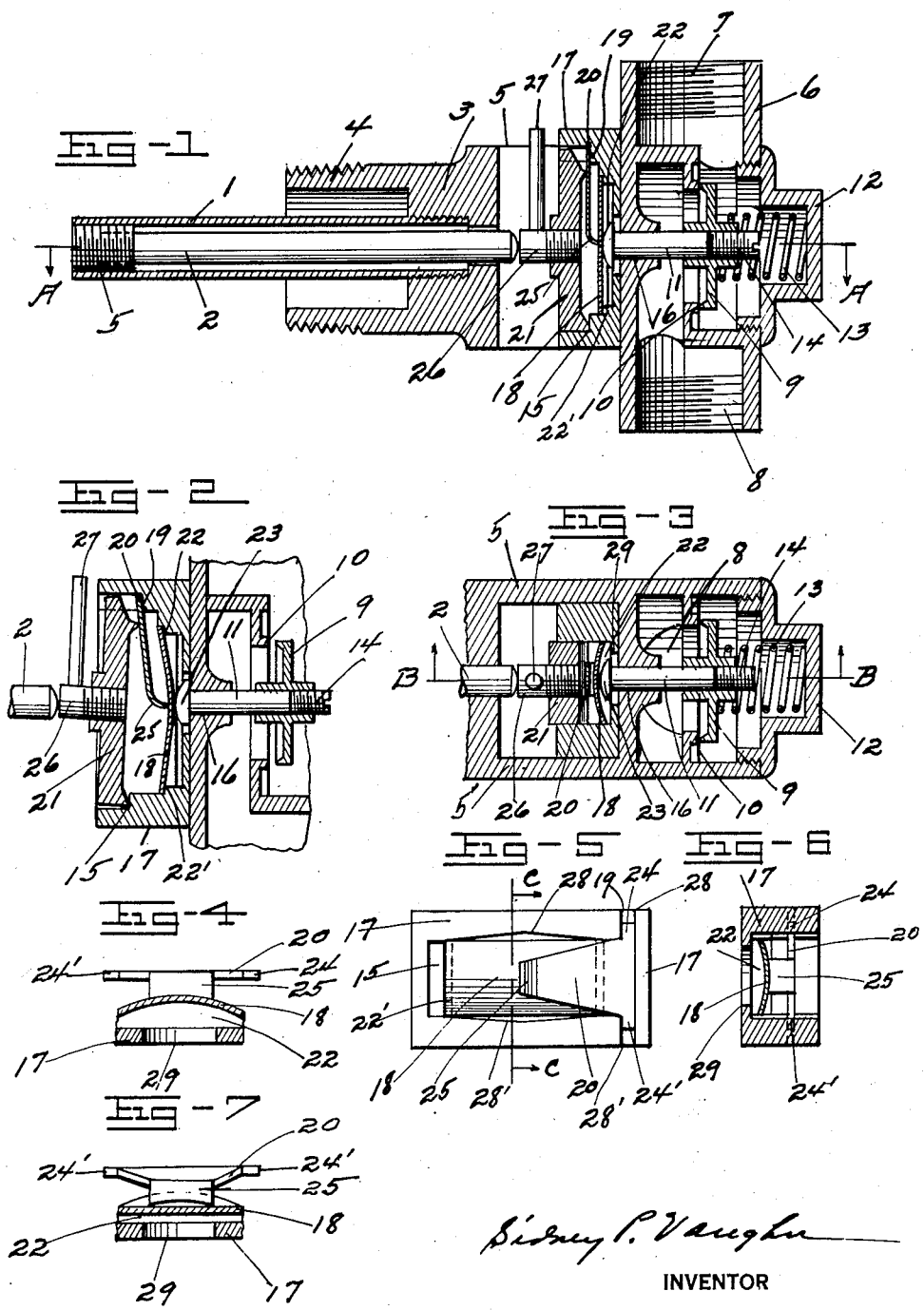

1,991,434

UNITED STATES PATENT OFFICE 1,991,434

THERMOSTATIC VALVE

Sidney P. Vaughn, United States Navy, Ackerman, Miss.

Application May 19, 1933, Serial No. 671,879

13 Claims. (Cl. 236—48)

(Granted under the act of March 3, 1883, as amended April 30, 1928; 370 O. G. 757)

This invention may be manufactured and used by or for the Government for governmental purposes without the payment to me of any royalty thereon.

This invention relates to thermostats in general but more particularly to snap action thermostatic valves used in controlling the flow of a gaseous fuel to burners used in heating hot-water heaters, ovens, and similar gas heated apparatus.

The principal object of my invention is to produce a snap action thermostatic valve of simple, compact and durable construction wherein the valve will be snapped either to an open or closed position as a result of the positioning of a temperature responsive element, whereby the supply of a combustible gas to a burner may be automatically initiated or discontinued as a result of temperature changes in the temperature responsive element.

Another object is to embody in said valve a simple type of snap device comprising a normally straight snap spring formed concavo-convex in cross section throughout its length, which, when a yielding pressure is applied to the middle of the convex side, will break or snap suddenly into a curvature at right angles to the original cross sectional curvature. It is positioned so as to actuate the valve to an open position when snapped by the applied pressure. When the pressure is removed it will snap back to its original form and permit the valve to close with a snap action. A special feature of the snap spring is the fact that its ends have a free and unconfined bearing contact on curved shoulders having a curve substantially the same as that of the snap spring.

Another object is the provision of a novel compound amplification lever system between the thermostatic element and the snap spring to amplify and transmit any movement of the thermostatic element to the snap device which in turn actuates the valve. The principal feature of this lever system is a resilient lever pivoted at one end with the free end in contact with the middle portion of the convex side of the snap spring; that part of the free end in contact with the snap spring having a transverse curvature the same as that of the snap spring. It is quite evident that if the thermostatic element has sufficient movement to operate the snap action element and the valve, such as a sylphon bellows, that the amplification levers may be eliminated entirely and the pressure applied directly by the thermostatic element to the snap spring.

The nature of the invention will be readily understood from the following description when read in connection with the accompanying drawing, and the novel features will be particularly pointed out in the description and in the appended claims.

Referring to the drawing:

Fig. 1 illustrates a central longitudinal section through a thermostatically controlled gas valve for water heaters made in accordance with my invention. (View on line B—B Fig. 3 looking in the direction of arrows).

Fig. 2 is an enlarged portion of Fig. 1 showing the position of the valve after it has been snapped to an open position.

Fig. 3 is a partial longitudinal section on line A—A Fig. 1.

Fig. 4 is a partial sectional view on line C—C Fig. 5 looking in the direction of arrows.

Fig. 5 is a plan view of lever and snap spring holder with master lever removed to show the position of the snap spring and the resilient lever.

Fig. 6 is a sectional view of holder on line C—C Fig. 5 looking in the direction of arrows.

Fig. 7 is the same as Fig. 4 showing the transverse form of the snap spring after it has been snapped by the resilient lever.

Like numerals refer to like parts throughout the several views.

The thermostat illustrated and embodying my invention comprises the usual thermostatic element 1, a copper or brass tube having a high coefficient of expansion, and a rod 2 of invar or other metal having a low coefficient of expansion. The tube 1 is threaded in a plug 3 having a hollow extension 4 externally threaded to screw into a tank containing the fluid to be heated by a gas burner, the gas supply of which is controlled by the thermostat. The rod 2 is secured at its outer end to a plug 5 screwed into the outer end of the tube 1 and soldered to make it water tight. The inner end of the rod 1 extends through the plug 3 and makes contact with an adjustment screw 26 to be more fully described hereinafter. By virtue of this connection it is evident that expansion and contraction of the tube 1 results in slight endwise movement of the rod 2.

The plug 3 is connected by spaced yoke members 5 and 5' to a hollow valve body 6 having a threaded inlet 7 for connection to a pipe supplying a gaseous fuel and a threaded outlet 8 for connection to burner used for heating the tank. The flow of the gas from the inlet 7 to the outlet 8 is controlled by a poppet valve 9 movable onto and off its seat 10 in a partition between the inlet and the outlet side of the valve body. The valve 9 is carried by and slidably mounted on a valve stem 11 extending through and slidably mounted in an opening 16 in the wall of the valve body in the direction of the rod 2 and concentric therewith. The valve 9 is forced toward its seat by a coiled compression spring 13 acting between the valve 9 and a plug 12 screwed in the wall of the valve body concentric with the valve. The valve is adjustable with relation to the outer end of the valve stem 11 by a screw 14 threaded in the valve stem bore of the valve. The inner end of the valve stem has a cap 23 to limit the inward movement of the valve stem and to prevent gas passing around the valve stem through the opening 16 in the valve body when the valve is open.

A holder 17 is mounted in the opening formed between the yoke members 5, in which is assembled the snap spring and amplification lever for amplifying and transmitting any movement of the rod 1 to the valve 9 with a snap action. The holder is preferably die-casted out of any suitable metal and has an opening 29 in the bottom thereof through which the valve stem passes.

According to the present invention I employ a thin snap spring 18, which is normally straight and concavo-convex throughout its length, supported unconfined by its ends on and with the concave side in contact with curved shoulders 22 and 22' formed in the end walls of the holder 17 near the bottom and so positioned that the middle portion of the concave side of the snap spring 18 will have a slightly spaced relation to the valve stem cap 23 when the valve is closed. I prefer to call the spring 18 a snap spring because of the fact that when a yielding pressure is applied to the middle portion of the convex side it will suddenly snap or bend and take a curved form at right angles to its original form as illustrated in Fig. 2, or, in other words, its transverse form at the point of pressure will be a straight line as illustrated in Fig. 7 instead of a curved line as illustrated in Fig. 4. The distortion of the snap spring is caused by the movement of the rod 2 above described, but since the movement of the rod is so slight it is necessary to provide means for amplifying the movement of the rod and transmitting the amplified movement to the convex side of the snap spring. This means comprises a compound lever system disposed in the holder between the rod 2 and the snap spring 18. The lever system comprises a stiff master lever 21 pivoted at one end on a shoulder 15 formed in one end of the holder 17 with the free end formed to make a transverse line contact with and near the pivoted end of a resilient lever 20 pivoted on a shoulder 19 formed in the inner wall of the opposite end of the holder. The free end 25 of the resilient lever is bent through a 90 degree angle toward the snap spring to make a transverse line contact with the middle portion of the convex side of the snap spring 18. The resilient lever 20 is held in position on its pivot point by lugs 24 and 24', formed by a side extension of the pivoted end of the lever, resting in a transverse groove 28 formed in the side walls of the holder (see Figs. 5 and 6). The bent or free end 25 of the resilient lever 20 is cut transversely to conform to the convex contour of the snap spring 18, as illustrated in Figs. 4 and 7. Fig. 4 illustrates the transverse curvature of the snap spring and the shape of the end 25 of the resilient lever before the snap spring is snapped. Fig. 7 illustrates the transverse form taken by the middle portion of the snap spring after it has been snapped.

The curved shoulders supporting the snap spring 18 and the shape of the end 25 of the resilient lever pressing against the snap spring perform a very important function in snapping the spring. Where the curvature of both is the same as that of the normal transverse curvature of the snap spring a very strong and quick snap is obtained, but as the curvature in either flattens out, the snap becomes weaker and more sluggish, due to increased preliminary distortions in the snap spring before it snaps.

The master lever 21 carries an adjustment screw 26 with the outer end disposed in contact with the inner end of the rod 2. The adjustment screw is provided with an arm 27 to turn the screw. Turning the adjustment screw in a clockwise direction, looking toward the thermostatic rod 2, advances the temperature at which the valve will snap open or shut. Turning the adjustment screw anti-clockwise decreases the temperature at which the valve will snap open or shut.

Figs. 5 and 6 illustrates view of the holder 17 with the snap spring 18 and the resilient lever 20 in position, but with the master lever removed. The central portion of the inner side walls 28 and 28' of the holder 17 are expanded away from the snap spring in order to give the middle portion of the snap spring free movement, but the walls close in toward each end of the holder to hold the snap spring in proper position and to prevent the ends of the snap spring from spreading when it is snapped, and to hold the lever system in proper alignment with the snap spring.

In operation, assuming that the valve 9 is closed as shown in Fig. 1, when the tube 1 contracts the end of the rod 2 moves slowly inwardly and presses against the adjustment screw 26 in the master lever 21, which causes the master lever to apply a pressure on the resilient lever 20 near its pivot point. The lever 20 being resilient exerts a yielding pressure on the middle portion of the convex side of the snap spring 18, which when sufficient causes the snap spring to suddenly break or snap and make contact with the head 23 of the valve stem 11 and open the valve as illustrated in Fig. 2, permitting the gas to flow to the burner. The resilient lever will hold the valve open until the tube 1 has expanded under a higher temperature to such an extent as to relieve the pressure acting on the resilient lever at which time the snap spring will suddenly regain its normal form and permit the valve to close with a quick movement under the action of the compression spring 13, thus shutting off the flow of gas to the burner.

An important feature of the snap spring used is that after it has been snapped it will continue bending without setting up strains in the metal that prevent it regaining its normal form after the bending pressure is relieved. When a concavo-convex snap disk or other form of over-center spring stamped out of spring metal is used, excessive pressure after it has been snapped over dead center into a reverse form is liable to set up strains in the metal that will prevent it regaining its normal form when the pressure is removed.

While I have illustrated and described the application of my invention to thermostatic valves, it should be understood that there are numerous other applications which are to be construed as coming within the spirit and scope of the following claims.

I claim:

1. In a thermostatic device of the character described, the combination with a thermostatic element arranged to move according to temperature variations, and a valve or other element arranged to be operated thereby, a body member connected to said thermostatic element, a resilient lever pivoted at one end to said body member, a stiff lever pivoted at one end to the body member with its free end bearing against the pivoted end of the resilient lever and moving with the thermostatic element, and a snap spring normally concavo-convex transversely throughout its length supported by its ends on shoulders on said body member and positioned so that the free end of the resilient lever bears against the convex side thereof, said valve being disposed so as to be operated by the concave side of the snap spring.

2. A device as set forth in claim 1 wherein the shoulders supporting the ends of the snap spring are arched to conform to the normal transverse curvature of the spring plate.

3. A device as set forth in claim 1 wherein the stiff lever has an adjustment screw intermediate the lever and the thermostatic element for advancing or delaying the action of the thermostatic element.

4. A device as set forth in claim 1 wherein the pivot bearing points of the levers and the shoulders for supporting the snap spring are formed in the inner walls of a holder disposed between the thermostatic element and the valve.

5. A device as set forth in claim 1 wherein the free end of the resilient lever pressing against the convex side of the snap spring is arched to conform to the transverse curvature of the snap spring.

6. A snap action device comprising a plate of spring metal substantially straight longitudinally and substantially concavo-convex transversely, convexly shaped shoulder means for supporting it unconfined by its ends, and means for applying a yielding pressure to the convex side in an amount sufficient to cause a middle portion of the plate to assume abruptly a substantially straight line position transversely and to continue bending in the direction of any additional applied force.

7. A device for transmitting and magnifying the movement of a thermostatic element to an element to be operated comprising a body member, a resilient lever pivoted at one end to said body member, a stiff lever pivoted at one end to said body member, the other end of said stiff lever bearing freely against said resilient lever adjacent its pivoted end, the thermostatic element bearing against said stiff lever between its pivoted end and its free end, an adjustable member adapted to project from said stiff lever and contact with the thermostatic element, a pair of spaced shoulders in said body member, and a snap spring normally concavo-convex transversely throughout its length supported on its ends on said shoulders, said shoulders being of the same convexity as said spring, the free end of said resilient lever bearing against the convex side of said snap spring, said free end being concavely shaped corresponding to the convexity of said snap spring, the element to be operated being in the path of the movement of the concave side of said snap spring when it is actuated.

8. A device for transmitting and magnifying the movement of a thermostatic element to an element to be operated comprising a body member, a resilient lever pivoted at one end to said body member, a stiff lever pivoted at one end to said body member, the other end of said stiff lever bearing freely aginst said resilient lever adjacent its pivoted end, the thermostatic element bearing against said stiff lever between its pivoted end and its free end, a pair of spaced shoulders in said body member, and a snap spring normally concavo-convex transversely throughout its length supported on its ends on said shoulders, said shoulders being of the same convexity as said spring, the free end of said resilient lever bearing against the convex side of said snap spring, said free end being concavely shaped corresponding to the convexity of said snap spring, the element to be operated being in the path of the movement of the concave side of said snap spring when it is actuated.

9. A device for transmitting and magnifying the movement of a thermostatic element to an element to be operated comprising a body member, a resilient lever pivoted at one end to said body member, a stiff lever pivoted at one end to said body member, the other end of said stiff lever bearing freely against said resilient lever adjacent its pivoted end, the thermostatic element bearing against said stiff lever between its pivoted end and its free end, an adjustable member adapted to project from said stiff lever and contact with the thermostatic element, a pair of spaced shoulders in said body member, and a snap spring normally concavo-convex transversely throughout its length supported on its ends on said shoulders, the free end of said resilient lever bearing against the convex side of said snap spring, said free end being concavely shaped corresponding to the convexity of said snap spring, the element to be operated being in the path of the movement of the concave side of said snap spring when it is actuated.

10. A device for transmitting and magnifying the movement of a thermostatic element to an element to be operated comprising a body member, a resilient lever pivoted at one end to said body member, a stiff lever pivoted at one end to said body member, the other end of said stiff lever bearing freely against said resilient lever adjacent its pivoted end, the thermostatic element bearing against said stiff lever between its pivoted end and its free end, an adjustable member adapted to project from said stiff lever and contact with the thermostatic element, a pair of spaced shoulders in said body member, and a snap spring normally concavo-convex transversely throughout its length supported on its ends on said shoulders, said shoulders being of the same convexity as said spring, the free end of said resilient lever bearing against the convex side of said snap spring, the element to be operated being in the path of the movement of the concave side of said snap spring when it is actuated.

11. A device for transmitting and magnifying the movement of a thermostatic element to an element to be operated comprising a body member, a resilient lever pivoted at one end to said body member, a stiff lever pivoted at one end to said body member, the other end of said stiff lever bearing freely against said resilient lever adjacent its pivoted end, the thermostatic element bearing against said stiff lever between its pivoted end and its free end, a pair of spaced shoulders in said body member, and a snap spring normally concavo convex transversely throughout its length supported on its ends on said shoulders, the free end of said resilient lever bearing against the convex side of said snap spring, the element to be operated being in the path of the movement of the concave side of said snap spring when it is actuated.

12. In a thermostatic device and a member arranged to be operated by the thermostatic device, a snap device comprising a plate of spring material normally straight in a longitudinal direction and normally concavo-convex in a transverse direction throughout its length, convex shoulder means, said convex shoulder means supporting said concavo-convex plate on the concave side thereof, the convex side of said plate being unconfined, said plate being supported between the thermostatic element and the member arranged to be operated by the thermostatic device whereby the plate will transmit the movement of the thermostatic device to the member with a snap action.

13. A device for transmitting and magnifying the movement of a thermostatic element to a member to be operated comprising a body member, a pair of spaced convexly shaped shoulders in said body member, and a snap spring normally concavo-convex transversely throughout its length supported unconfined on its ends on said convex shoulders, the motion of the thermostatic element acting against the convex side of said snap spring, the member to be operated being in the path of the movement of the concave side of said snap spring when it is actuated.

SIDNEY P. VAUGHN.